United States Patent
Bersiek

(10) Patent No.: US 6,608,406 B2
(45) Date of Patent: *Aug. 19, 2003

(54) RACK MOUNTABLE POWER DISTRIBUTION APPARATUS

(75) Inventor: Shamel A. Bersiek, Laguna Hills, CA (US)

(73) Assignee: S+S Power Engineering, Lake Forest, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/469,978

(22) Filed: Dec. 21, 1999

(65) Prior Publication Data

US 2002/0070610 A1 Jun. 13, 2002

(51) Int. Cl.[7] ................................. H02B 1/00
(52) U.S. Cl. ..................... 307/125; 307/11; 361/627
(58) Field of Search ................... 307/17, 125, 11; 361/601, 602, 603, 627, 634

(56) References Cited

U.S. PATENT DOCUMENTS

| | | | | |
|---|---|---|---|---|
| 3,525,906 A | * | 8/1970 | Schubert | 361/623 |
| 4,249,227 A | | 2/1981 | Kato et al. | |
| 4,626,953 A | * | 12/1986 | Nilssen | 307/31 |
| 4,644,320 A | * | 2/1987 | Carr et al. | 340/310 |

(List continued on next page.)

FOREIGN PATENT DOCUMENTS

| | | | | |
|---|---|---|---|---|
| DE | 10010198 A1 | * | 9/2001 | ........... H02G/11/02 |
| JP | 401085531 A | * | 3/1989 | |
| JP | 406276727 A | * | 9/1994 | |
| JP | 408331712 A | * | 12/1996 | |

OTHER PUBLICATIONS

POWERWARE 5140 User's Guide, Jul. 1999.*
POWERWARE, "PowerPass Prestige 3000.UPS brochure", May. 1999.*
POWERWARE, "5140 Rack–Mount UPS brochure", Jul. 1999.*
TOSHIBA, "1600/1600 Plus Series UPS brochure", Dec. 1999.*
HEWLETT PACKARD, "E7671A Modular Power Distribution Unit Tecnical Data Sheet", Jan. 1999.*
UNISYS, "UP800 Series UPS brochure", Jul. 1999.*
Pulizzi Engineering Inc. 1999 Catalog.

Primary Examiner—Brian Sircus
Assistant Examiner—Roberto J. Rios

(74) Attorney, Agent, or Firm—Stout, Uxa, Buyan & Mullins, LLP; Frank J. Uxa

(57) ABSTRACT

Power distribution apparatus include a rack mountable housing, an electrical power input assembly and an electrical power output assembly including a plurality of external circuits adapted for hardwired to remote equipment and a plurality of internal circuits each adapted to receive a plug of electrical equipment and to provide power thereto. The plurality of internal circuits may include differently configured receptacles adapted to receive differently configured plugs.

20 Claims, 4 Drawing Sheets

U.S. PATENT DOCUMENTS

| | | | |
|---|---|---|---|
| 4,652,769 A | * 3/1987 | Smith et al. | 361/615 |
| 4,731,703 A | * 3/1988 | Tsukaguchi et al. | 361/623 |
| 4,777,607 A | 10/1988 | Maury et al. | |
| 5,095,403 A | * 3/1992 | Pin et al. | 361/601 |
| 5,164,609 A | * 11/1992 | Poppe et al. | 307/147 |
| 5,415,564 A | * 5/1995 | Winter et al. | 439/535 |
| 5,486,664 A | * 1/1996 | Lamp et al. | 200/297 |
| 5,516,298 A | * 5/1996 | Smith | 439/131 |
| 5,528,453 A | * 6/1996 | Berman et al. | 361/625 |
| 5,544,003 A | * 8/1996 | Vaughan | 361/602 |
| 5,548,086 A | 8/1996 | Greenfield et al. | |
| 5,598,322 A | 1/1997 | Von Arx et al. | |
| 5,602,721 A | * 2/1997 | Slade et al. | 361/727 |
| 5,656,915 A | * 8/1997 | Eaves | 320/6 |
| 5,675,194 A | 10/1997 | Domigan | |
| 5,721,458 A | 2/1998 | Kearney et al. | |
| 5,731,942 A | 3/1998 | Raviele | |
| 5,747,734 A | * 5/1998 | Kozlowski et al. | 174/50 |
| 5,768,079 A | 6/1998 | Buell | |
| 5,773,757 A | * 6/1998 | Kenney et al. | 174/53 |
| 5,784,249 A | * 7/1998 | Pouliot | 361/622 |
| 5,789,828 A | * 8/1998 | Tremaine et al. | 361/610 |
| 5,808,876 A | 9/1998 | Mullenbach et al. | |
| 5,821,636 A | 10/1998 | Baker et al. | |
| 5,838,533 A | 11/1998 | Yazaryan et al. | |
| 5,861,683 A | * 1/1999 | Engel et al. | 361/601 |
| 5,894,392 A | * 4/1999 | McDonald | 361/42 |
| 5,901,033 A | 5/1999 | Crawford et al. | |
| 5,932,933 A | 8/1999 | Asanuma | |
| 5,995,348 A | * 11/1999 | McCartan et al. | 361/42 |
| 6,229,691 B1 | * 5/2001 | Tanzer et al. | 361/622 |
| 6,232,675 B1 | * 5/2001 | Small | 307/38 |

* cited by examiner

RACK MOUNTABLE POWER DISTRIBUTION APPARATUS

BACKGROUND OF THE INVENTION

The present invention generally relates to electrical power distribution apparatus, and more particularly relates to low cost, multi-function, rack mountable electrical power distribution apparatus and systems.

Research and development of computer technology has continually produced smaller and more compact systems. However, electrical power distribution units and systems for supplying power to electrical devices, such as computers and other critical equipment, in a building or other facility have remained bulky and sometimes difficult to work with.

Conventionally, electrical power coming into a facility passes into a free-standing power distribution unit (PDU) that includes a substantial plurality of output circuits. Each of these circuits is hard-wired to cables which are passed through conduits for distances of up to about 200 feet or more, to individual components of critical equipment. A total conduit run of up to about 3000 feet per PDU can occur. This wiring is often run through floors and walls of the facility during the electrical wiring phase of building construction. Electrical outputs initiating from such free-standing PDUs are typically provided as cables that are accessible through walls and floors of the facility.

Electrical needs in a building frequently change, typically by an increase in demand for more output circuits to accommodate more pieces of equipment. Power strips including a number of plug receptacles and having a single circuit breaker may be connected to a wall receptacle. However, in many cases, a power strip is not appropriate or sufficient for large scale changes in electrical needs, or for accommodating additional pieces of critical equipment which requires hard-wired connections to the power source.

The process of re-cabling electrical output circuits from the PDU, for example, to more strategic locations within the facility, is a costly, labor intensive task, which typically requires the work of outside contractors who specialize in electrical cabling and rewiring. Because of the inherent difficulty of accessing a specific wire or cable from the numerous, and sometimes tangled masses of cables and wires concealed within walls or floors of the facility, obsolete and unusable cables are often left in place adding to the confusion and difficulty of maintaining or controlling such wiring.

Clearly, there is a need for power distribution units and systems that address the concerns presented by conventional systems.

SUMMARY OF THE INVENTION

New electrical power distribution apparatus and systems have been discovered. The present apparatus are compact in design, cost effective and labor and time saving. The present apparatus and systems provide versatility and flexibility in meeting electrical power requirements in both large and small facilities.

In one broad aspect, electrical power distribution apparatus in accordance with the invention comprise a housing and an electrical power input assembly, preferably located substantially in the housing, adapted to be connected to an electrical power supply, for example, a commercial power supply, preferably an uninterruptible power supply or UPS, which is provided from a conventional power source, e.g., generating plant. The apparatus, and in particular, the housing, preferably is rack-mountable, for example, on a conventional 19 inch or 23 inch industry standard rack. This rack mountable feature is highly advantageous in that the present apparatus is compact, can be placed on a rack for easy installation and maintenance. This rack mountable feature provides the present apparatus with substantial benefits relative to conventional, free standing and large or bulky PDU's.

The apparatus in accordance with the invention further comprises a plurality of electrical power output assemblies, preferably located substantially in the housing, adapted to receive electrical power from the power input assembly. The power output assemblies may be mounted in a circuit panel that is removably mounted in the housing. Preferably, the plurality of output assemblies includes at least one output connection adapted to be hard-wired, for example, to a piece of equipment in a manner similar to hard-wiring equipment to a conventional power distribution unit. The plurality of output assemblies may, and preferably does, also include at least one output receptacle adapted to receive an equipment plug to provide electrical power, for example, to the equipment associated with the equipment plug. Thus, the present apparatus are effective in coupling directly to local pieces of equipment through conventional receptacles, as well as being hard-wired to remote pieces of equipment, or alternatively to one or more additional separate power distribution apparatus in accordance with the present invention. It is noted that the hard-wired output connection may hereinafter sometimes be referred to as an "external circuit", and the output receptacle or receptacle circuit may hereinafter sometimes be referred to as an "internal circuit".

In one advantageous embodiment of the invention, the plurality of output assemblies may include a plurality of differently configured receptacles adapted to receive differently configured equipment plugs. This feature advantageously adds to the flexibility of the present apparatus.

In another aspect of the invention, each of the external circuits and/or internal circuits includes a different, individually operable circuit breaker, although more than one circuit, such as two or more internal circuits, can be associated with the same circuit breaker.

Unlike large, free-standing power distribution units, the present electrical power distribution apparatus may be adapted for receiving and distributing single phase power, thus making it convenient for small electrical applications. The apparatus, however, may also be adapted for use with a three phase power. Advantageously, the input assembly is adapted to be electrically connected to a single phase electrical power supply, or alternately to a three phase electrical power supply.

Preferably, the electrical power input assembly further comprises a meter, for example, located substantially in the housing, adapted to monitor at least one property of the electrical power passing through the input assembly. For example, the meter may be a voltage meter for monitoring voltage being provided to the apparatus. More sophisticated meters may be employed to provide enhanced electrical power monitoring. For example, a multi-function monitor, such as the 7300 ION-TRAN model sold by Power Measurement, may be advantageously employed.

In addition, a transformer, for example, a step down transformer, may be provided. The transformer preferably is adapted to be in electrical communication with both the electrical power supply and the input assembly. Because of the compact nature of the present apparatus, the transformer, which is often a substantial source of heat, preferably is located outside the housing, for example, in the outdoors or other environment where the heat produced can be effectively dissipated.

In an additional aspect of the present invention, electrical power distribution systems are provided. The present systems generally comprise a plurality of electrical power distribution apparatus configured such that each electrical power distribution apparatus is adapted to be electrically connected with at least one of the other electrical power distribution apparatus. At least one, and preferably more than one, of the electrical power distribution apparatus included in the present systems is an apparatus in accordance with the present invention, for example, as described herein.

In one very useful embodiment, the present systems provide a single primary electrical power distribution apparatus in electrical communication with one or more electrical power distribution apparatus in accordance with the present invention, for example, hardwired to the primary power distribution apparatus through an output connection of the primary electrical power distribution apparatus. Such systems very effectively distribute electrical power while reducing the amount of wiring required for such distribution. Since each of the power distribution apparatus included in the present systems preferably are effective to provide both receptacle circuits and hardwired circuits, each individual power distribution apparatus making up the system is able to provide power to pieces of equipment located close to the power distribution apparatus, for example, using the receptacle circuits, and to pieces of equipment which are relatively remote from the power distribution apparatus, for example, using the output connections which are adapted to be hardwired to such pieces of equipment. The use of the present power distribution apparatus in such electrical power distribution systems takes advantage of the flexibility and versatility of the present electrical power distribution apparatus.

Any and all features described herein and combinations of such features are included within the scope of the present invention provided that the features of any such combinations are not mutually inconsistent.

These and other aspects of the present invention will become apparent in the following detailed description, particularly in conjunction with the accompanying drawings in which like parts bear like reference numerals.

DETAILED DESCRIPTION

Figure 1:
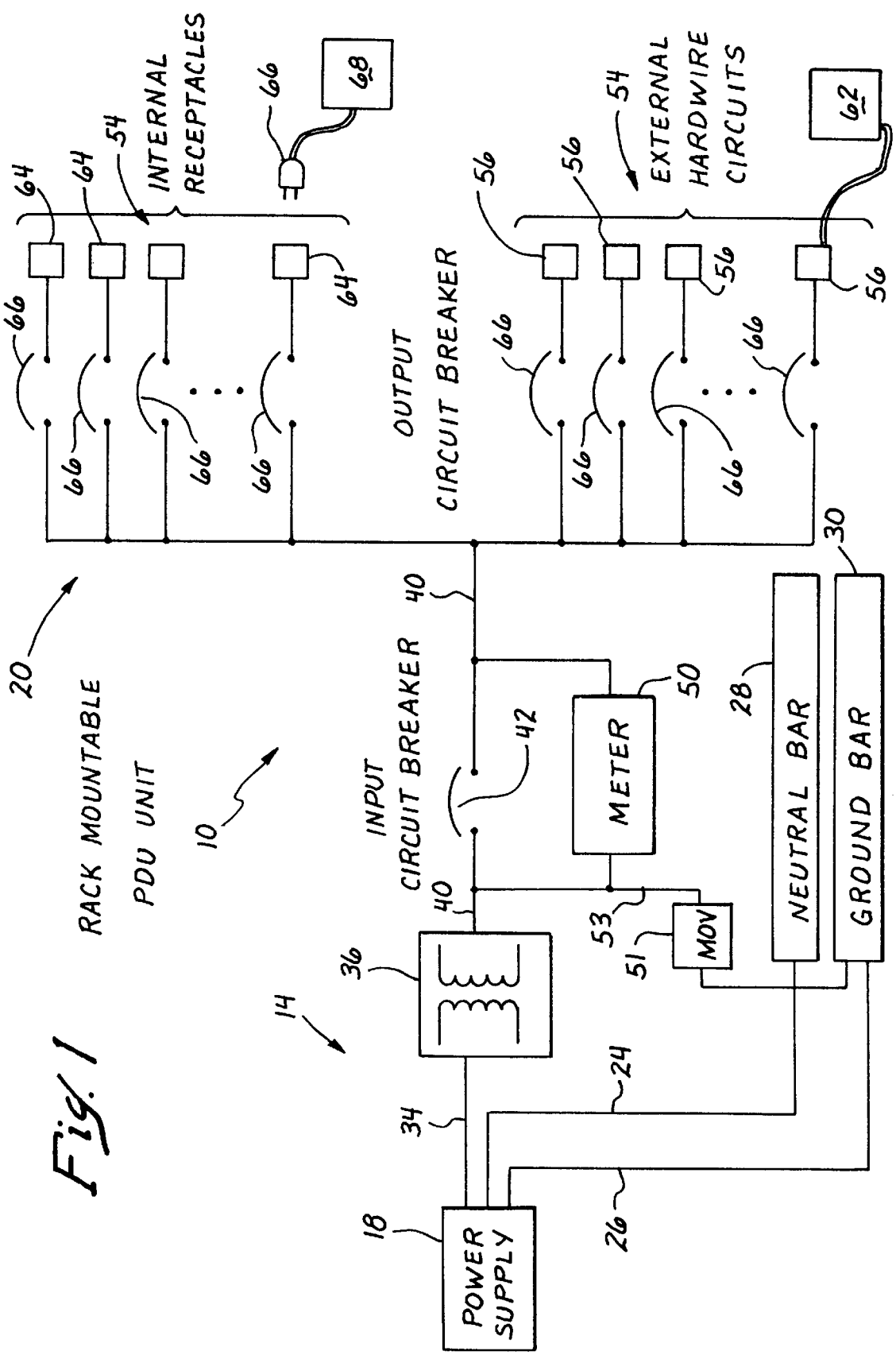
FIG. 1 is a circuit diagram of a power distribution apparatus in accordance with the present invention showing an electrical power input assembly and multiple, electrical power output assemblies including both local receptacles and remote output connections.

Turning now to FIG. 1, a power distribution apparatus 10, in accordance with the invention is represented by a block circuit diagram. The apparatus 10 generally comprises an electrical power input assembly, represented generally at 14, adapted to receive power from an uninterruptable electrical power source or supply 18, and a plurality of electrical power output assemblies, represented generally at 20, adapted to receive and distribute electrical power from the input assembly 14. The power supply 18 may be provided by a commercial power source, for example, a single phase system or three phase system. Neutral and ground lines 24 and 26, respectively, are shown connecting the power supply 18 to a neutral bus bar 28 and a ground bus bar 30 respectively, as is conventional.

Electrical power through power input line 34 is passed through a transformer 36, of conventional design, adapted to be in electrical communication with both the electrical power supply 18 and the input assembly 14. The transformer 36 is a step-down transformer adapted to step down the voltage of the power from the power supply, for example, from 3 phase 480V AC in line 34 to 3 phase 208V AC in line 40.

The input assembly 14 includes an input circuit breaker 42 of conventional design. The input circuit breaker 42 functions to protect apparatus 10 against surges of high voltage electrical power. In addition, a meter 50, for example, a volt meter and/or an amp meter, may be provided for measuring at least one property of the electrical power, for example, voltage and/or current, passing through the input assembly 14 along line 40. Further, a metal oxide varister, or MOV, 51 is provided in line 53 which extends from the high side of input circuit breaker 42 to ground bus bar 30. MOV 51, of conventional design, functions to suppress power surges from power supply 18. It is to be understood that transformer 36, meter 50 and MOV 51 are optional so that apparatus including none, one, two or all three of the components are included within the scope of the present invention.

The electrical power output assemblies 20 are adapted to provide electrical power to both remote locations by cable connections and to local electronic components and other equipment. More particularly, the electrical power outputs 54 from the output assemblies 20 include a plurality of output connections 56 adapted to be hard-wired to pieces of electrical equipment, for example, main frame computer 62, in a manner similar to connecting a conventional PDU to such a piece of equipment. Preferably, at least about eight output connections 56 are provided, although the number can range up to about 30 or about 40 or more.

The electrical power outputs 54 further include a plurality of electrical output receptacles 64 adapted to receive a pronged plug 66 for providing power to a local piece of equipment, for example, a personal computer 68, located near the apparatus 10. The number of output receptacles can range up to about 40 or about 50 or more. It is noted that the term "electrical output receptacles" is considered herein to include various standard and nonstandard plug receptacles, as well as any suitable wiring means for connecting the power input assembly 14 to such various plug receptacles. In one embodiment of apparatus 10, a plurality of differently configured receptacles, adapted to receive differently configured plugs, are provided.

It is to be appreciated that the present power distribution apparatus 10, in accordance with the present invention, may be configured such that the plurality of electrical power outputs 54 include at least one output, and preferably a plurality of output connections 56, adapted to be hard wired to a remote location or equipment, and at least one output receptacle 64, and preferably a plurality of output receptacles 64, plug for providing power to a local piece of equipment.

However, the output receptacles 64 may be optional. When utilizing a single phase power supply through input assembly 14, the present apparatus 10 offers the advantage of being a compact, for example, rack mountable, power distribution apparatus having the capability of being connected to remote equipment through external connections or circuits 56. The apparatus 10 may thus be used as a distribution sub-system providing an electrical interface, or distribution center, between a conventional PDU and several components of equipment, including remote, electric equipment which is hardwired to the apparatus 10.

In one embodiment of the invention, each of the output connections 56 and output receptacles 64 is associated with a different, i.e. independently operable, circuit breaker 66. Such circuit breakers 66 act or function to provide surge protection for the individual pieces of equipment, for example, main frame computer 62 and personal computer 68, electrically connected to apparatus 10. Of course, if desired, two or more output connections 56 or two or more output receptacles 64 can be associated with the same output circuit breaker 66.

Figure 2:
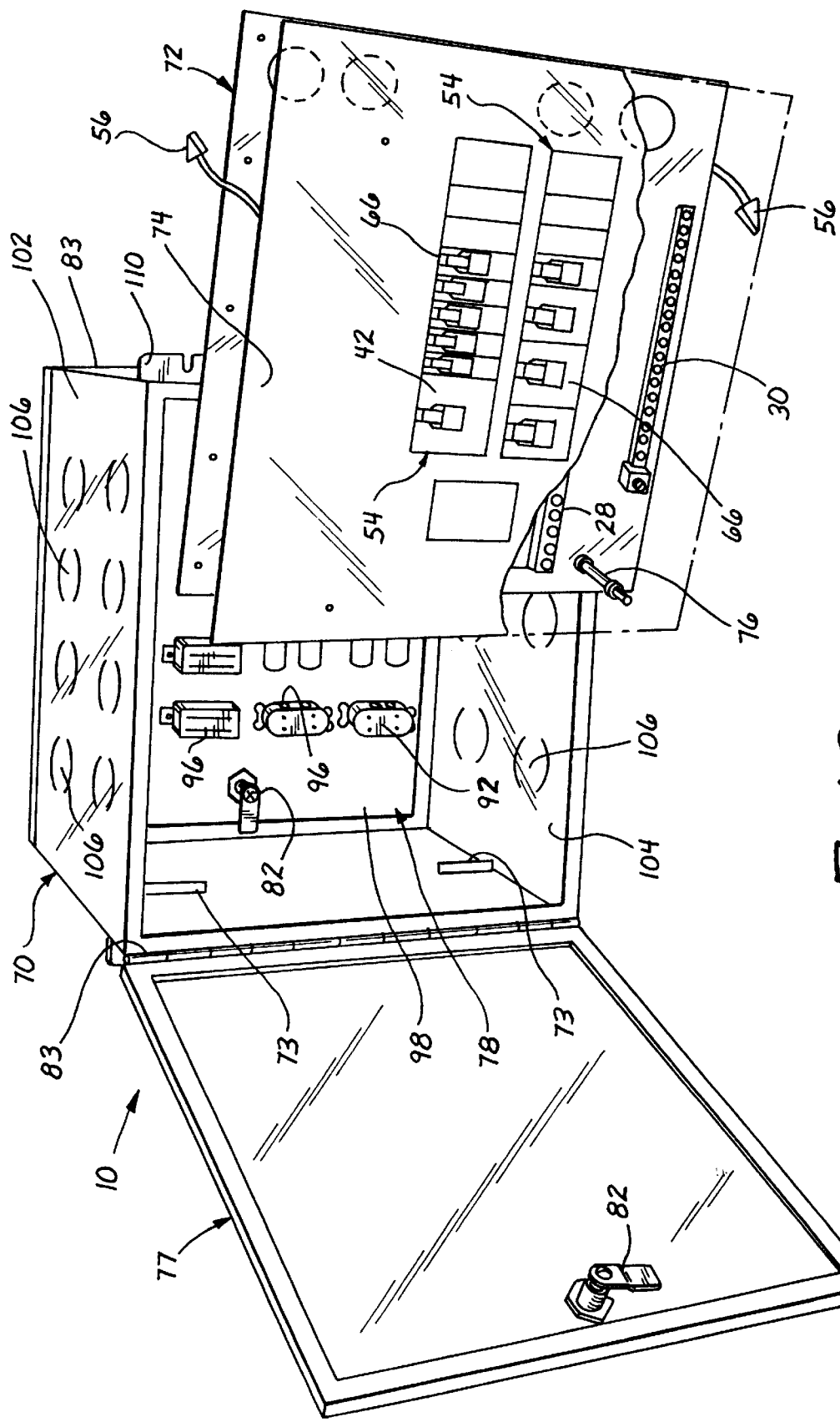
FIG. 2 is a perspective view of a partially disassembled embodiment of a power distribution apparatus in accordance with the present invention.
Figure 3:
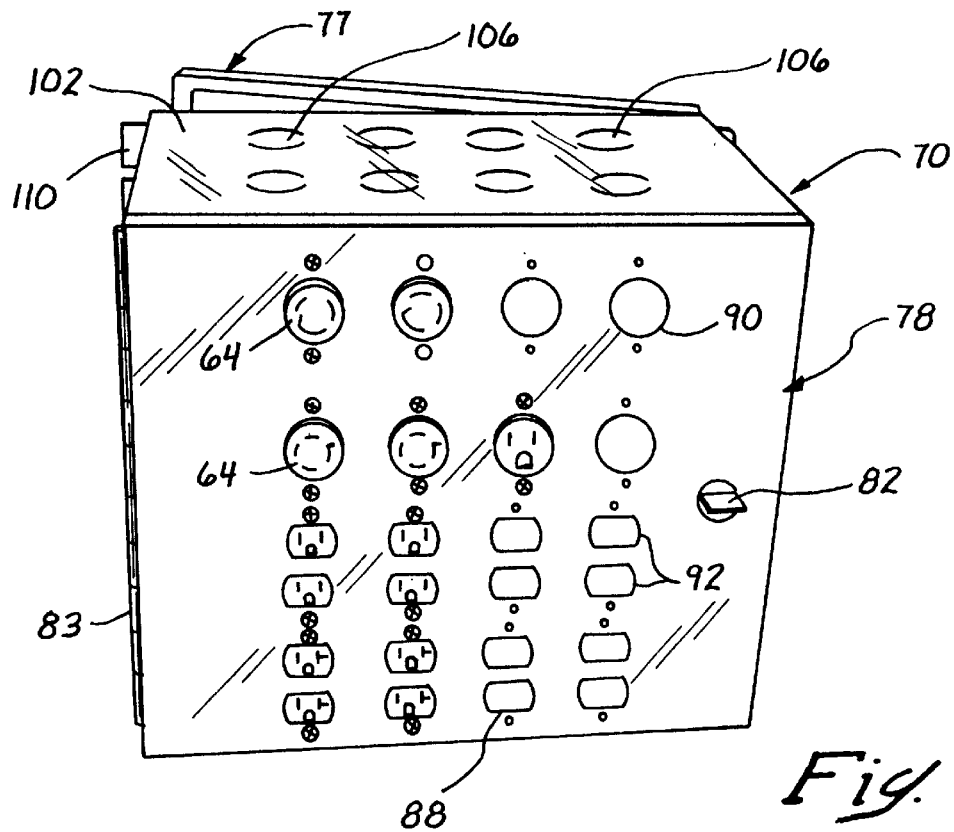
FIG. 3 is a back view, in perspective, of the embodiment (assembled) shown in FIG. 2.
Figure 4:
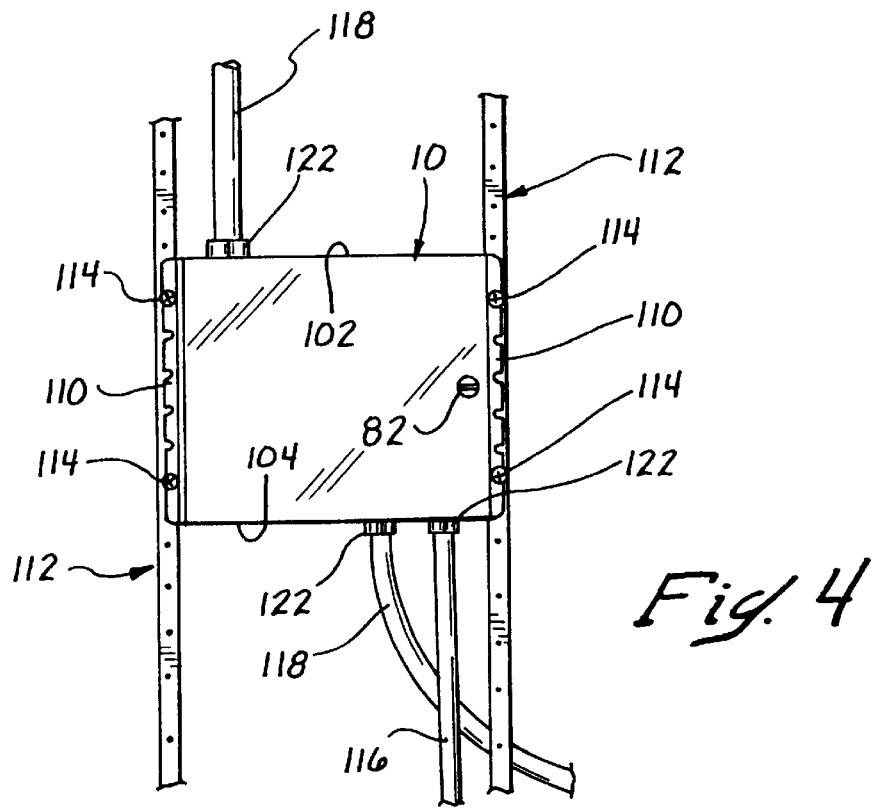
FIG. 4 is a front view of the embodiment shown in FIGS. 2 and 3, in which the apparatus has been mounted to an industry standard rack.

The invention may be more clearly understood with respect to FIGS. 2, 3 and 4 which show a preferred embodiment of the apparatus 10. The apparatus 10 preferably comprises a housing 70 made of one or more suitable materials of construction, such as steel, aluminum, and the like.

The apparatus further comprises a circuit panel 72 removably mounted within the housing 70. A bracket 73 within the housing 70 provides for supporting the circuit panel 72, without the panel 72 being bolted or otherwise secured in place. The plurality of electrical power output assemblies 20 are mounted in the circuit panel 72. The circuit panel 72 may have a removable cover 74 (shown in partially cut away view in FIG. 3), with the power input circuit breaker 42 and power output circuit breakers 66 being made accessible through on the circuit panel cover 74, as shown. The cover 74 is mounted to the circuit panel 72 by suitable connectors 76.

As shown in FIGS. 2 and 3, the housing 70 may have two access doors, specifically a first or front door 77 and a second or back door 78, each preferably including a latch 82 and hinges 83. The first door 76 enables access to the circuit breakers 42 and 66.

Referring to FIG. 3, the second door 78 includes openings or apertures 92 for exposing the output receptacles 64 for use. For example, differently configured apertures 92 may be defined in the door 78 to accommodate the differently configured receptacles 64. For example, a pair of apertures 92 may be used for exposing a conventionally designed, duplex receptacle 64 for receiving a three pronged plug. The interior side 98 of second door 78, has outlet receptacles 64 mounted thereto, is shown in FIG. 2. Suitable electrical wiring is provided within the circuit panel 72 for enabling electrical connection between contact terminals 96 of the receptacles 64 and the electrical power input assembly 14. Such wiring and connections between the input assembly 14 and the parallel output assemblies 20 is considered conventional and therefor will not be described in detail herein.

Preferably, the housing 70 includes top and bottom panels 102, 104 having knockouts 106 for enabling access to the "external" output connectors 56. One of the knockouts 106 may be used to provide access for insertion of an input cable (not shown in FIG. 2) from the power supply 18, in which lines from a power input cable are connected to circuit breaker 42 (through transformer 36), neutral bus or bar 28 and ground bus or bar 30. It is noted that when the power supply is a three phase electrical power supply, the input circuit may include three power input lines ("hot" lines) carrying 208 V. For distributing power from a one or single phase power supply, two hot lines carrying 208V or alternatively 1 hot line carrying 120 V may be provided.

An important aspect of the invention is shown in FIG. 4. More specifically, the housing 70 is rack-mountable. For example, the housing 70 may be appropriately sized, and include external mounts 110, for enabling the apparatus 10 to be mounted on a conventional 19 inch or 23 inch, or other small sized, industry standard rack 112. For example, the housing 70 may have a length, height and depth measurement of about 17×19×5 inches. Fasteners, such as conventional nut/bolt combinations 114 are employed to secure housing 70 to rack 112. In the embodiment shown, a power supply input cable 116 and two electrical power output cables 118 are connected through top and bottom panels 102 and 104 of the housing 70 by suitable mounting connectors 122.

Figure 5:
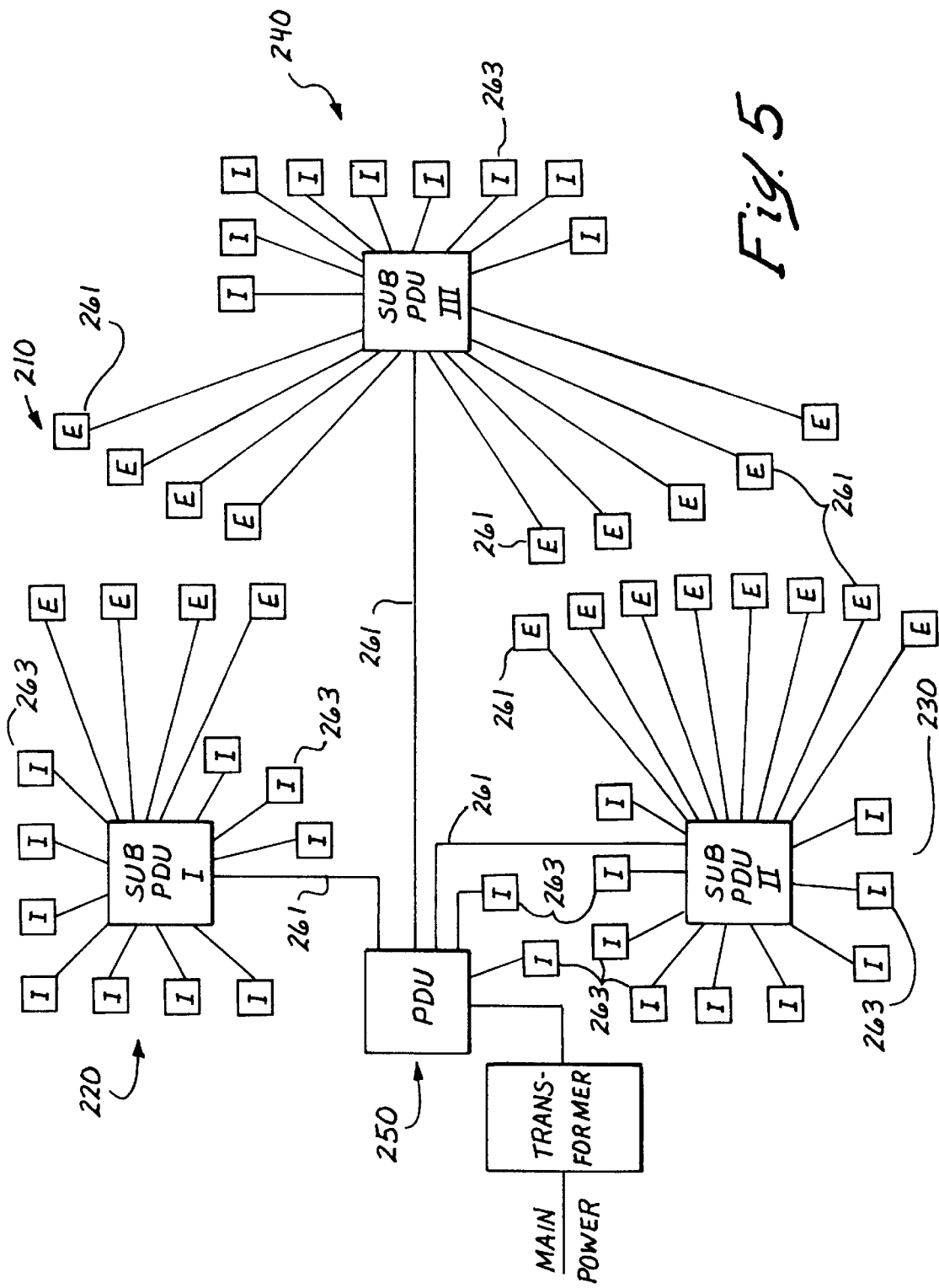
FIG. 5 is a diagram of a power distribution system, including a plurality of power distribution apparatus, in accordance with the present invention.

A power distribution system 210 in accordance with the present invention is shown in block diagram in FIG. 5. Preferably, the system 210 comprises a plurality of electrical power distribution apparatus 220, 230, 240 and 250 made in accordance with the present invention as described herein, wherein each of the apparatus 220, 230, 240 and 250 receives electrical power supplied by a main power source, for example, commercial power supplied through primary power distribution unit 250. The system 210 may be used to supply and distribute electrical power through a building or other facility (not shown). Each of the apparatus 220, 230, 240 and 250 include multiple output connectors (external circuits) 261, as well as multiple output receptacles (internal circuits) 263. It is to be appreciated that each apparatus 220, 230, 240 is electrically connected to apparatus 250 through an output connector 261, as shown in FIG. 5. In one embodiment, primary power distribution unit 250 can be replaced by a conventional PDU which has only hard-wired circuits.

The present apparatus 10 and system 210 have the capacity to meet the power requirements and needs of both large and small facilities. As can be appreciated, the apparatus 10 and system 210 reduce or substantially eliminate many of the problems associated with conventional power distribution units and systems. The present apparatus and systems also greatly facilitate trouble shooting when electrical problems arise, thereby reducing maintenance costs and employee down-time. For example, if an electrical problem arises at one workstation, the problem can be quickly tracked and investigated without the need to eliminate power to other workstations that are functioning satisfactorily. This is made possible by means of different and separately operable circuits made available through the present power distribution apparatus and systems.

While this invention has been described with respect to various specific examples and embodiments, it is to be understood that the invention is not limited thereto, and that it can be variously practiced within the scope of the following claims.

What is claimed is:

1. An electrical power distribution unit comprising:
   a housing structured to be mounted in a fixed position on a rack;

an electrical power input assembly, which comprises a circuit panel and no transformer, the power input assembly being located substantially in the housing of the power distribution unit and the circuit panel is structured to be directly hard-wired connected to a commercial electrical power supply provided by a commercial power supply source; and a plurality of electrical power output assemblies located substantially in the housing, electrically connected to the input assembly, and structured to receive electrical power from the input assembly, the plurality of electrical power output assemblies including a plurality of first output connections each of which is structured to be hard-wired to a piece of equipment to provide electrical power, wherein at least one of the first output connections is structured to be connected to a second electrical power distribution unit, and a plurality of second output connections each of which comprises a receptacle structured to receive an equipment plug to provide electrical power.

2. The power distribution unit of claim 1 wherein the housing includes a front access door and a back access door.

3. The power distribution unit of claim 1 which further comprises a meter located within the housing and structured to monitor at least one property of electrical power passing through the input assembly.

4. The power distribution unit of claim 1 wherein the input assembly is structured to be electrically connected to a three phase electrical power supply.

5. The power distribution unit of claim 1 wherein the input assembly is structured to be electrically connected to a single phase electrical power supply.

6. The power distribution unit of claim 1 wherein each of the output assemblies includes a different circuit breaker.

7. The power distribution unit of claim 1 wherein the plurality of electrical power output assemblies includes a plurality of differently configured receptacles for accommodating differently configured equipment plugs.

8. The power distribution unit of claim 1 wherein the plurality of electrical output assemblies are mounted in the circuit panel.

9. The power distribution unit of claim 1 wherein the plurality of receptacles comprises differently configured receptacles for accommodating differently configured equipment plugs.

10. The power distribution unit of claim 1 wherein the plurality of first output connections comprise at least about 8 output connections.

11. The power distribution unit of claim 1 wherein the plurality of receptacles comprises at least about 8 receptacles.

12. An electrical power distribution unit for directly passing electrical power from a commercial power supply source to a structure, comprising:

a rack mounted housing;

an electrical power input assembly located substantially in the housing of the power distribution unit and structured to be directly hard-wired connected to a commercial electrical power supply provided by a commercial power supply source; and a plurality of electrical power output assemblies located substantially in the housing, electrically connected to the input assembly, and structured to receive electrical power from the input assembly, the plurality of electrical power output assemblies including a plurality of first output connections structured to be hard-wired to a piece of equipment to provide electrical power, wherein at least one of the first output connections is structured to be connected to a second electrical power distribution unit, and a plurality of second output connections structured to receive an electrical plug.

13. The power distribution unit of claim 12 wherein the housing is structured to be mounted on a 19 inch or 23 inch rack.

14. The power distribution unit of claim 12 which further comprises a meter located within the housing and structured to monitor at least one property of electrical power passing through the input assembly.

15. The power distribution unit of claim 12 wherein each of the output assemblies includes a different circuit breaker.

16. An electrical power distribution system for a building, comprising:

a plurality of electrical power distribution units, at least one electrical power distribution unit directly hard-wired connected to a commercial power supply provided by a commercial power source, and each electrical power distribution unit electrically hard-wired connected with at least one other electrical power distribution unit, each electrical power distribution unit comprising:

a housing;

an electrical power input assembly located substantially in the housing of the power distribution unit and structured to be electrically hard-wired connected to an electrical power supply; and a plurality of electrical power output assemblies located substantially in the housing, electrically connected to the input assembly, and structured to receive electrical power from the input assembly the plurality of electrical power output assemblies including a plurality of first output connections structured to be hard-wired to a piece of equipment to provide electrical power and at least one receptacle structured to receive an equipment plug and to provide electrical power.

17. The system of claim 16 wherein each of the housings is rack mountable.

18. The system of claim 16 wherein each of the electrical power distribution units further comprises a meter disposed within the housing and structured to monitor at least one property of electrical power passing through the input assembly.

19. The system of claim 16, wherein each electrical power input assembly comprises a circuit panel without a transformer.

20. The system of claim 16, wherein the at least one electrical power distribution unit directly hard-wired connected to a commercial power supply is structured to be directly connected to a 480 volt alternating current power supply.

* * * * *